(12) United States Patent
Magnier

(10) Patent No.: US 12,259,050 B1
(45) Date of Patent: Mar. 25, 2025

(54) TECHNOLOGIES FOR PREVENTING THE EXPLOSION OF ELECTRICAL TRANSFORMERS

(71) Applicant: Philippe Magnier LLC, Houston, TX (US)

(72) Inventor: Philippe Magnier, Houston, TX (US)

(73) Assignee: PHILIPPE MAGNIER LLC, Houston, TX (US)

( * ) Notice: Subject to any disclaimer, the term of this patent is extended or adjusted under 35 U.S.C. 154(b) by 0 days.

(21) Appl. No.: 18/789,031

(22) Filed: Jul. 30, 2024

Related U.S. Application Data

(60) Provisional application No. 63/555,652, filed on Feb. 20, 2024.

(51) Int. Cl.
 *H01F 27/14* (2006.01)
 *F16K 17/04* (2006.01)
 *H01F 27/02* (2006.01)

(52) U.S. Cl.
 CPC ........... *F16K 17/044* (2013.01); *H01F 27/02* (2013.01)

(58) Field of Classification Search
 CPC .......... H02G 3/08; H02G 3/081; H01F 27/02; H01F 27/00; H01F 27/14; F16K 17/044; F16K 17/00; H05K 5/00; H05K 5/0004
 USPC ................ 174/50, 520, 19, 17 R, 21 R, 559; 220/3.2, 3.3; 361/600, 601, 603, 623, 361/641, 35
 See application file for complete search history.

(56) References Cited

U.S. PATENT DOCUMENTS

| | | | |
|---|---|---|---|
| 5,946,171 A | 8/1999 | Magnier | |
| 6,804,092 B1 | 10/2004 | Magnier | |
| 7,210,497 B2 | 5/2007 | Herz | |
| 7,317,598 B2 | 1/2008 | Magnier | |
| 8,264,804 B2 | 9/2012 | Magnier | |
| 10,811,180 B1 * | 10/2020 | Basore | F16K 17/16 |
| 11,946,552 B2 * | 4/2024 | Basore | H01F 27/025 |

FOREIGN PATENT DOCUMENTS

FR   2739486 A1   9/1995

OTHER PUBLICATIONS

IEEE Power and Energy Society, Transformers Committee, "IEEE Guide for Tank Rupture Mitigation of Liquid-Immersed Power Transformers and Reactors," IEEE Std C57.156, 2016.

* cited by examiner

*Primary Examiner* — Angel R Estrada
(74) *Attorney, Agent, or Firm* — David R. Metzger; Dentons US LLP

(57) ABSTRACT

A device (10) for preventing explosions of electrical transformers including an adaptor (11) with (a) a first drilled interface (111) in a lower wall, (b) a second drilled interface (112) in an upper wall and concentric with the first drilled interface (111), and an adaptor outlet (113a) with an adaptor outlet flange (113) on the upper wall. The adaptor (11) is configured to be secured to a transformer tank outlet flange (2d) of a transformer tank outlet (2c). The adaptor outlet flange (113) is configured to receive a static spring pressure release valve (22). The second drilled interface (112) is configured to receive either an angle elbow (19) to which is attached an overly high transient oil pressure release member (15) or the overly high transient oil pressure release member (15).

19 Claims, 8 Drawing Sheets

TECHNOLOGIES FOR PREVENTING THE EXPLOSION OF ELECTRICAL TRANSFORMERS

RELATED APPLICATION INFORMATION

This application claims priority to and the benefit of U.S. Provisional Application No. 63/555,652, filed Feb. 20, 2024, which is fully incorporated herein by reference to the extent permitted by law.

TECHNICAL FIELD OF THE INVENTION

The present invention concerns technologies for preventing explosion of electrical power transformers cooled by a volume of combustible fluid.

BACKGROUND

Electrical transformers sustain energy losses both in their windings and iron parts causing energy loss dissipated as heat. Thus, electrical transformers are generally cooled by a dielectric oil that ignites above a flash point temperature, for instance about 140° C. for mineral oils. Transformers are expensive, therefore particular attention is paid to their protection.

Transformers generally comprise a tank body made of steel with a bottom wall, four peripheral walls, and, closing the tank body, an upper wall also called a tank cover. The transformer tank peripheral walls may be equipped with radiators for cooling the dielectric oil by thermal exchange with the ambient air.

In the first instance, an insulation fault inside transformers may generate a strong electrical arc prompting actions by electrical protections such as differential relays, overvoltage relays, etc. which trigger the transformer power circuit breaker. Triggering the circuit breaker results in isolating the transformer from its energy source. But, before the transformer is isolated, the fault electrical arc results in a very fast energy transfer to the transformer dielectric oil provoking an immediate oil decomposition in very hot explosive and flammable gases, especially hydrogen and acetylene, among numerous others.

Consequently, after an insulation fault, the very hot explosive and flammable gases discharge provokes a very violent internal deflagration and the mechanical pressure inside the closed transformer tank full of dielectric oil increases very rapidly. This abrupt internal pressure increase causes important mechanical stresses to the transformer tank leading to rupture of its mechanical linkages (bolts, welds) and the tank's explosion places the very hot explosive and flammable gases in contact with the oxygen in ambient air. Since acetylene self-ignites in the presence of oxygen (air) at 300° C., after a tank explosion fire breaks out immediately and fire can spread to other site equipment which are also likely to contain large quantities of combustible substances.

Strong electrical arcs provoking transformer explosions are originated by insulation rupture caused by overloads, voltage surges, insulation gradual deterioration, insufficient oil level, a failure of an insulation component, etc.

In the prior art, fire extinguishing systems for transformers were activated by fire detectors. However, these systems operate when the transformer oil is already burning. Therefore, it was accepted to merely restrict the fire outbreak to the equipment concerned so as not to the fire to spread to neighboring installations.

U.S. Pat. No. 5,946,171 discloses a method for preventing explosion and fire of a closed transformer tank full of combustible coolant fluid by activation of its electrical protections in addition to a transformer tank high pressure sensor activation. Sensor signals initiate tank depressurization by using a valve and in addition injecting a pressurized inert gas at tank bottom for cooling metal and fluid hot parts as well as to prevent oxygen from penetrating the tank. This method was satisfactory and prevented transformer tanks from exploding.

U.S. Pat. No. 6,804,092 discloses a rupture element with rapid opening for an electric transformer explosion prevention device.

U.S. Pat. No. 7,317,598 discloses an improved device allowing an extremely fast transformer tank depressurization system to increase the probability of saving from explosions transformer tanks and their components also containing dielectric oil, such as high voltage diverter switches called "On Load Tap Changers" and high voltage penetrations called "Bushings" by using simply shaped elements. This type of installation has saved hundreds of human lives.

Here, the Applicant discovered that there is an unmet need for protecting transformers with standard or existing tank (2) openings with an efficient and compact explosion prevention system when:
- Costs and budgetary matters are a breaking point for the security of people living or working close to transformers, especially for lower and medium power transformers for which the costs of explosion and fire prevention systems are high compared to transformer prices.
- In service transformers cannot be machined onsite to include an explosion prevention system.
- The weights and dimensions of an explosion prevention system added to a transformer are limited.
- Transformers need compact explosion prevention because of the presence of other industrial equipment, or reduced sized subterranean transformer rooms called bunkers, or because of property issues.

SUMMARY

As noted above, the inventor discovered that there is a need for protecting transformers with standard or existing tank openings from explosion with an efficient and compact explosion prevention system thereby providing for the security of people living or working close to transformers. This need is especially important for medium and lower power transformers for which the cost of explosion and fire prevention systems are high compared to transformer prices.

Disclosed herein are one or more inventions addressing this need. To that end, the inventions make use of standard openings on the electrical transformer tanks. This enables retrofitting of already installed electrical transformers with explosion prevention devices or systems. The most common tank opening available in all transformer tanks is the outlet flange positioned on an upper wall of the tank, also called a tank cover, which outlet flange is designed to gas-tightly cooperate with a static spring pressure relief valve (PRV) configured to open above a static pressure threshold (22). In accordance with principles disclosed herein, use is made of such an opening.

Disclosed herein is an adaptor (11) for an electrical transformer explosion prevention device comprising:
in cross section, an upper wall and a lower wall spaced from the upper wall;

a first drilled interface (111) in a first region of the lower wall;

a second drilled interface (112) in a first region of the upper wall, the first drilled interface and the second drilled interface being concentric with a first axis;

a first set of bolt holes positioned about the first drilled interface (111) and a second set of bolt holes positioned about the second drilled interface (112), the first set of bolt holes and the second set of bolt holes being aligned such that the adaptor (11) can be secured to a transformer tank outlet flange (2*d*) of a transformer tank outlet (2*c*) initially structured to host a static spring pressure relief valve, and with the first drilled interface (111) in fluid communication with the transformer tank outlet (2*c*); and an adaptor outlet (113*a*) with an adaptor outlet flange (113) secured to the body at a second region of the upper wall and concentric with a second axis, the adaptor outlet (113) having a third set of bolt holes with which a static spring pressure relief valve (22) can be attached to the adaptor outlet flange member (113*a*).

In an embodiment of the adaptor (11), the second drilled interface (112) and adaptor outlet flange (113) are coplanar.

In an embodiment of the adaptor (11), the first axis and the second axis are parallel to each other.

In an embodiment of the adaptor (11), the adaptor outlet flange (113) in the second axis and the first drilled interface 111 and second drilled interface (112) in the first axis are in parallel planes.

In an embodiment of the adaptor (11), wherein in the first axis the second drilled interface (112) has a same or larger inner diameter than an inner diameter of the first drilled interface (111).

Disclosed herein is a device (10) for preventing explosion of an electrical transformer due to overly high transient oil pressure comprising:

an adaptor (11) as set forth above, the adaptor (11) coupled to a transformer tank outlet flange (2*d*) of a transformer tank outlet (2*c*) with the first drilled interface (111) in fluid communication with the transformer tank outlet (2*c*);

a static spring pressure release valve (22) coupled to the adaptor outlet (113*a*) and the adaptor outlet flange (113);

an angle elbow (19) with an angle elbow inlet flange (190) bolted by means of bolts to the adaptor second drilled interface (112) for securing the adaptor (11) to the transformer tank outlet flange (2*d*) bolted to the first drilled interface (111);

an overly high transient oil pressure release member (15) coupled to and in fluid communication at its inlet face with an angle elbow outlet flange (191) of the angle elbow (19);

a diffuser (16) with a diffuser inlet flange (160) attached to the outlet of the overly high transient oil pressure release member (15);

a duct (13) attached to the diffuser outlet flange (164) and capable of conducting an oil and flammable gas mixture away from the transformer tank (2) when the overly high transient oil pressure release member (15) opens; and at least one shock absorber (14) located upstream or downstream of the diffuser (16) to eliminate very vigorous transformer shocks produced by immediate strong explosive gases generation provoked by internal rupture of insulation in the transformer (1), the shock absorber (14) being designed to avoid breaking of pipes, ducts, or gaskets because of shocks which would render useless the device (10) for preventing explosion of electrical transformers, wherein, an isolating oil fills the adaptor (11) and the angle elbow (19) up to the inlet face of the overly high transient oil pressure release member (15), the device (10) is activated following a transformer short-circuit, the overly high transient oil pressure release member (15) opens by transformer tank (2) overly high transient oil pressures generated by internal rupture of insulation in the transformer (1), the overly high transient oil pressure release member (15) is configured to open in response to an explosive overly high transient surge in oil pressure and allow the oil and flammable gas mixture to flow into the diffuser (16), the overly high transient oil pressure release member (15) is set to open at an oil pressure that is higher than that at which the transformer static spring pressure relief valve (22) opens because the static spring pressure relief valve (22) is not designed to react to an overly high transient oil pressure, and the diffuser (16) receives the oil and gas mixture released upon opening of the overly high transient oil pressure member (15) and quickly facilitates depressurization of the oil inside the transformer tank (2) to avoid its explosion.

In an embodiment of the device (10), the device (10) further comprises an oil sump (134) on a transformer ground (3), wherein:

(a) the duct (13) includes a horizontal first duct pipe (131), a duct elbow (132) and a second duct pipe (133) that extends vertically downward;

(b) the first duct pipe (131) is in fluid communication with the duct elbow (132) and the second duct pipe (133) to direct oil downward to the oil sump (134) in the transformer ground (3) by way of the second duct pipe (133); and (c) in use during a transformer short-circuit, the oil and flammable gas mixture ejected from the diffuser (16) is conveyed to an oil sump (134) located on a transformer ground (3) by way of the duct (13), but then the oil remining in the first duct pipe (131) is allowed to return to the diffuser (16) due to a slight downward slope of the first duct pipe (131).

In an embodiment of the device (10), the device (10) further comprises a separator (21) fixed on a wall (30) for separating oil and flammable gas in the oil and flammable gas mixture, wherein:

(a) the duct (13) further comprises a horizontal first duct pipe (131), a duct elbow (132) and a second duct pipe (133) that extends vertically upward, the first duct pipe (131), the elbow (132) are in fluid communication with the second duct pipe (133);

(b) the second duct pipe (133) is connected to and in fluid communication with the separator (21), and (c) in use during a transformer short-circuit, the oil and flammable gas mixture ejected from the diffuser (16), is conveyed to the separator (21) by way of the duct (13), but due to a slight downward slope down of the first duct pipe (131) the oil is allowed to return to the diffuser (16) from the separator (21) after the flammable gases have been separated out from the oil and flammable gas mixture in the separator (21).

In an embodiment of the device (10), the device (10) further comprises a separator (21) fixed on fixed on a transformer ground (3) for separating oil from flammable gas in the oil and flammable gas mixture, wherein:

(a) the duct (13) comprises a horizontal first duct pipe (131), a duct elbow (132) and a second duct pipe (133) that extends vertically downward, the first duct pipe (131), the duct elbow (132) and the second duct pipe (133) are in fluid communication, (b) the second duct pipe (133) is connected to and in fluid communication with the separator (21), and (c) in use during a transformer short-circuit, the oil and flammable gas mixture ejected from the diffuser (16), is conveyed to the separator (21) by way of the duct (13), but then due to a slight slope of the first duct pipe (131) the oil is allowed to return to the diffuser (16) from the separator (21) after the flammable gases have been separated from the oil in the flammable gas mixture in the separator (21).

In an embodiment of the device (10), the diffuser (16) comprises:
a diverging wall (161);
a converging wall (163); and
a cylindrical wall (162) between the diverging wall (161) and the converging wall (163).

In an embodiment of the device (10), at least one shock absorber (14) is located upstream of the diffuser (16).

In an embodiment of the device (10) at least one shock absorber (14) is located downstream of the diffuser (16).

In an embodiment of the device (10):
at least one shock absorber (14) is attached to the diffuser outlet flange (164); and
the diffuser (16), and a first duct pipe (131) of the duct (13) are aligned along a third axis, the third axis being sightly inclined upward relative to horizontal to allow oil to return to the transformer tank (2) after explosion of the transformer (1) has been avoided.

In an embodiment of the device (10), the diffuser (12) comprises:
a diverging wall (161) and a converging wall (163); and
a cylindrical wall (162) between the diverging wall (161) and the converging wall (163), the cylindrical wall (162) having an internal diameter that is at least twice as large as each of those of the overly high transient oil pressure release member (15), the diffuser inlet flange (160) and the diffuser outlet flange (164).

Disclosed herein is a piping arrangement for evacuating oil and gas from a duct (13) in fluid communication with a diffuser (16) to conduct an oil and flammable gas mixture to an oil sump (134) in an electrical transformer ground (3) for separating oil and flammable gas in the oil and flammable gas mixture, wherein:

(a) the duct (13) includes a duct elbow (132) and a second duct pipe (133) that extends vertically downward;

(b) the duct elbow (132) is in fluid communication with the first duct pipe (131) and the second duct pipe (133) to direct oil that does not return to the diffuser (16) downward to the oil sump (134) in the transformer ground (3) by way of the second duct pipe (133); and (c) in use during a transformer short-circuit, an oil and flammable gas mixture ejected from the diffuser (16), is conveyed to the oil sump (134) located on a transformer ground (3) by way of the duct (13), but then, due to a slight downward slope of the first duct pipe (131), oil remining in the first duct pipe (131) oil is allowed to return to the diffuser (16) and transformer tank (2).

Disclosed herein is a piping arrangement for evacuating oil and gas from a duct (13) in fluid communication with a diffuser (16) to conduct an oil and flammable gas mixture to a separator (21) fixed on a wall (30) for separating oil from flammable gas in the oil and flammable gas mixture, wherein:

(a) the duct (13) comprises a first duct pipe (131), a duct elbow (132) and a second duct pipe (133) oriented upward, the first duct pipe (131) and the duct elbow (132) are in fluid communication with the second duct pipe (133);

(b) the second duct pipe (133) is connected to and in fluid communication with the separator (21); and (c) in use during transformer short-circuit, an oil and flammable gas mixture ejected from the diffuser (16), is conveyed to the separator (21) by way of the duct (13), but after the flammable gases have been separated from the oil of flammable gas mixture in the separator (21), the oil contained in the separator (21) and in the duct pipe (13) is allowed to return to the diffuser (16) and transformer tank (2).

Disclosed herein is a piping arrangement for evacuating oil and gas from a duct (13) in fluid communication with a diffuser (16) to conduct an oil and flammable gas mixture to a separator (21) fixed on an electrical transformer ground (3) for separating oil from flammable gas of the oil and flammable gas mixture, wherein:

(a) the duct (13) comprises a first duct pipe (131), a duct elbow (132) and a second duct pipe (133) oriented downward, the first duct pipe (131), duct elbow (132) and the second duct pipe (133) are in fluid communication;

(b) the second duct pipe (133) is connected to and in fluid communication with the separator (21); and (c) in use during transformer short-circuit, an oil and flammable gas mixture ejected from the diffuser (16), is conveyed to the separator (21) by way of the duct (13), but after the flammable gases have been separated from the oil in the flammable gas mixture in the separator (21), the oil contained in the first duct pipe (131) is allowed to return to the diffuser (16) and transformer tank (2).

Disclosed herein is a piping arrangement comprising:
a separator (21) for separating oil from flammable gas in an oil and gas mixture;
an air isolation shutter (20) to prevent ingress of air and gases into the separator (21); and
a flammable gas evacuation pipe (17) in fluid communication with the separator (21) and the air isolation shutter (20) to communicate the flammable gas from the separator (21) to the air isolation shutter (20).

Disclosed herein is a piping arrangement comprising:
a separator (21) for separating oil from flammable gas in an oil and gas mixture;
an air isolation shutter (20) to prevent ingress of air and gases into the separator (21);
a flammable gas evacuation pipe (17) in fluid communication with the separator (21) and the air isolation shutter (20) to communicate the flammable gas from the separator (21) to the air isolation shutter (20); and
a flame arrestor (176) located at an outlet of the air isolation shutter (20).

Disclosed herein is a control arrangement (400) comprising:
a control unit (23) capable of monitoring operation of the device (10);
the overly high transient oil pressure relief member (15);

the static pressure relief valve (22);
an automatic shutter valve (5); and
circuit breakers (306),
wherein,
   the control unit (23) is equipped with information processing means receiving signals from at least the overly high transient oil pressure relief member (15), the automatic shutter valve (5), and the static pressure relief valve (22) for transmitting a signal for tripping the transformer circuit breaker (306) or for triggering a preventive fire extinguishing process.

Disclosed herein is an installed electrical transformer (1) retrofitted with a device (10) for preventing an explosion of an electrical transformer due to overly high transient oil pressure.

Disclosed herein is an uninstalled electrical transformer provided with a device (10) for preventing an explosion of an electrical transformer due to overly high transient oil pressure.

Disclosed herein is a device (10) for preventing explosion of electrical transformers due to overly high transient oil pressure, comprising:
   an adaptor (11) coupled to a transformer tank outlet flange (2d) of a transformer tank outlet (2c) with the first drilled interface (111) in fluid communication with the transformer tank outlet (2c);
   a static spring pressure release valve (22) coupled to the adaptor outlet (113a) and the adaptor outlet flange (113);
   an overly high transient oil pressure release member (15) directly coupled to the adaptor (11) and in fluid communication up to its inlet face with the second drilled interface (112);
   a vertically oriented diffuser (16) with a diffuser inlet flange (160) attached to and in fluid communication with an outlet of the overly high transient oil pressure release member (15) only when the overly high transient oil pressure release member (15) opens due to an overly high transient oil pressure in the transformer tank (2) generated by an internal rupture of insulation in the transformer (1) causing a transformer short-circuit.
   an angle elbow (19) with an angle elbow inlet flange (190) bolted to a diffuser outlet flange 164);
   a duct (13) capable of conducting an oil and flammable gas mixture away from the angle elbow (19); and
   at least one shock absorber (14) located downstream of the diffuser (16) to eliminate very vigorous transformer shocks produced by immediate strong explosive gases generation provoked by internal rupture of insulation in the transformer (1), the shock absorber (14) being designed to avoid breaking of pipes, ducts, or gaskets because of the shocks which would render useless the device (10) for preventing explosion of electrical transformers,
wherein,
   the diffuser (16), the overly high transient oil pressure release member (15) are aligned along the first axis,
   during normal transformer operation, an insulating oil fills the adaptor (11) up to an inlet face of the overly high transient oil pressure release member (15),
   during a transformer short-circuit, the overly high transient oil pressure release member (15) is configured to open in response to an explosive overly high transient surge in oil pressure and allow the oil and flammable gas mixture to flow into the diffuser (16),
   the overly high transient oil pressure release member (15) is set to open at an oil pressure that is higher than that at which the transformer static spring pressure relief valve (22) opens because the static spring pressure relief valve (22) is not designed to react to an overly high transient oil pressure, and
   the diffuser (16) receives the oil released upon opening of the overly high transient oil pressure member (15) and quickly facilitates depressurization of the oil inside the transformer tank (2) to avoid its explosion.

Because transformers (1) are often exploding by rupture of insolation inside tanks (2) at their junction between the base of the bushings (6) and the transformer windings, disclosed herein is an arrangement for preventing explosion of electrical transformer occurring from the bushings (6) connection at their base to the transformer windings with three respective bushing turrets (BT) (6a) or three bushing oil cable boxes (BOCB) (6a) equipped with flanges (6d), comprising a device (10) according to claim 6, with three adaptors (11) respectively attached to the three flanges (6d) of the BTs or the BOCBs.

These and other features are explained in the following detailed description with reference to the accompanying drawings.

BRIEF DESCRIPTION OF THE DRAWINGS

The present invention(s) will be better understood by studying the detailed description of a few embodiments supported with non-limiting examples, and illustrated by the related drawings in which:

FIG. 1b illustrates a cross section of the adaptor of FIG. 1a.

DETAILED DESCRIPTION

Figure 1:
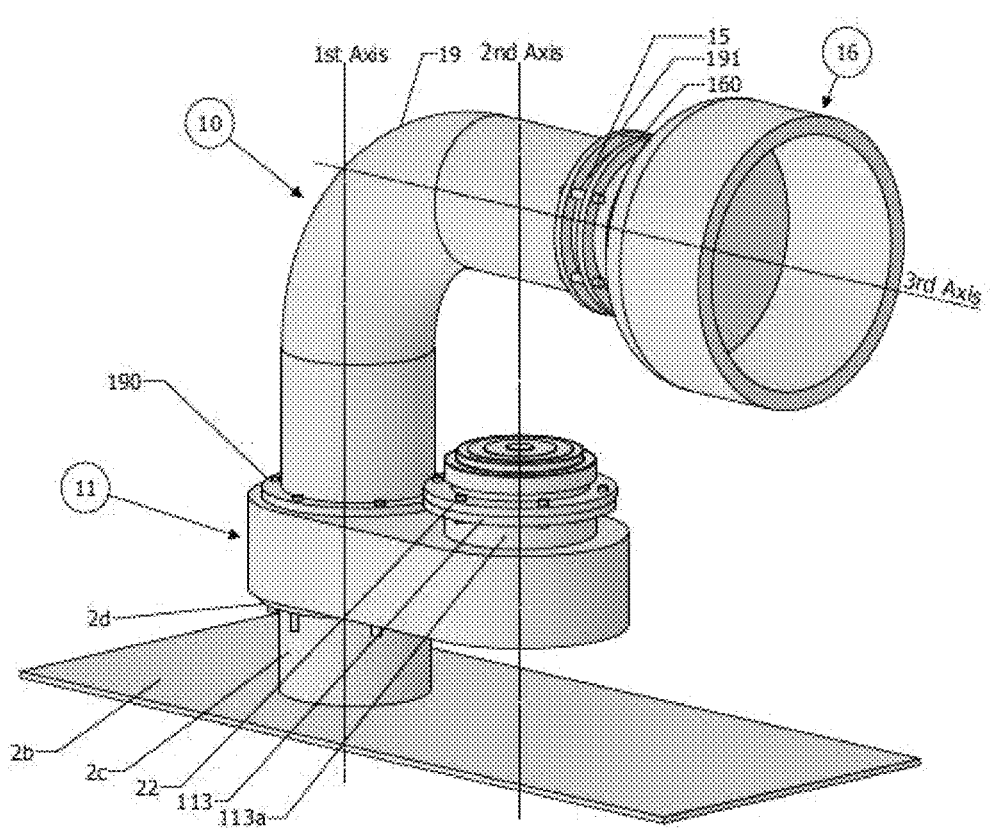
FIG. 1 illustrates in perspective view a device for preventing explosion of electrical transformation employing principles disclosed herein.

While the invention is susceptible to various modifications and alternative forms, only specific embodiments thereof are shown by way of examples in drawings and will herein be described in detail.

The drawings and detailed descriptions thereto are not intended to limit the invention to the specific disclosed arrangement; on the contrary the intention is to cover all modifications, equivalents and alternatives falling within the spirit and scope of the present invention for preventing explosion of electrical transformers as defined by the appended claims.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof.

As used herein, a term "or" is intended to mean an inclusive "or" rather than an exclusive "or." That is, unless specified otherwise, or clear from context, "X employs A or B" is intended to mean any of a set of natural inclusive permutations. That is, if X employs A; X employs B; or X employs both A and B, then "X employs A or B" is satisfied under any of the foregoing instances.

As used herein, a term "or others," "combination", "combinatory," or "combinations thereof" refers to all permutations and combinations of listed items preceding that term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. Skilled artisans understand that typically there is no limit on number of items or terms in any combination, unless otherwise apparent from the context.

Further, it will be understood that when an element, including component or subsystem, is referred to and/or shown as being "connected" or "coupled" to another element, it can be directly connected or coupled to the other element or intervening elements may be present. In contrast, when an element is referred to as being "directly connected" or "directly coupled" to another element, then there are no intervening elements present.

It will be understood that although terms such as "first" and "second" are used herein to describe various elements, these elements should not be limited by these terms. These terms are only used to distinguish one element from another element. Thus, an element discussed below could be termed a second element, and similarly, a second element may be termed a first element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
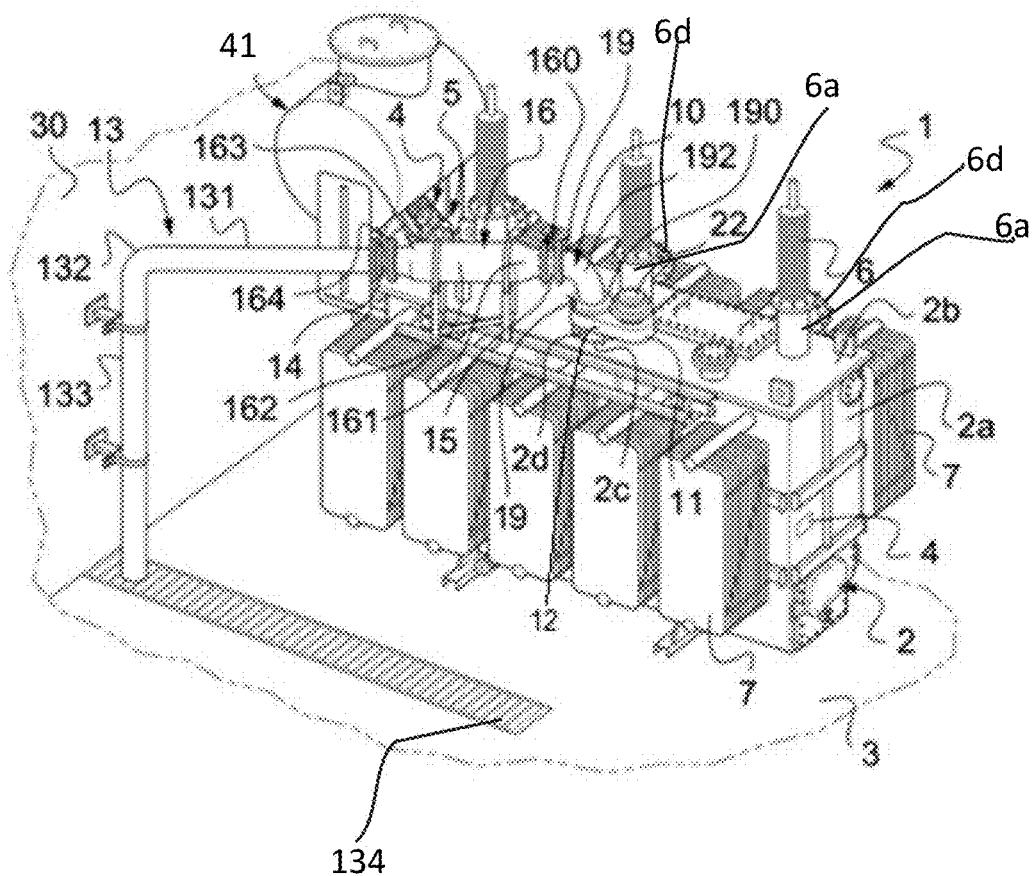
FIG. 2 illustrates in perspective view a transformer equipped with a first device or system for preventing explosion of electrical transformers according to further principles disclosed herein.
Figure 3:
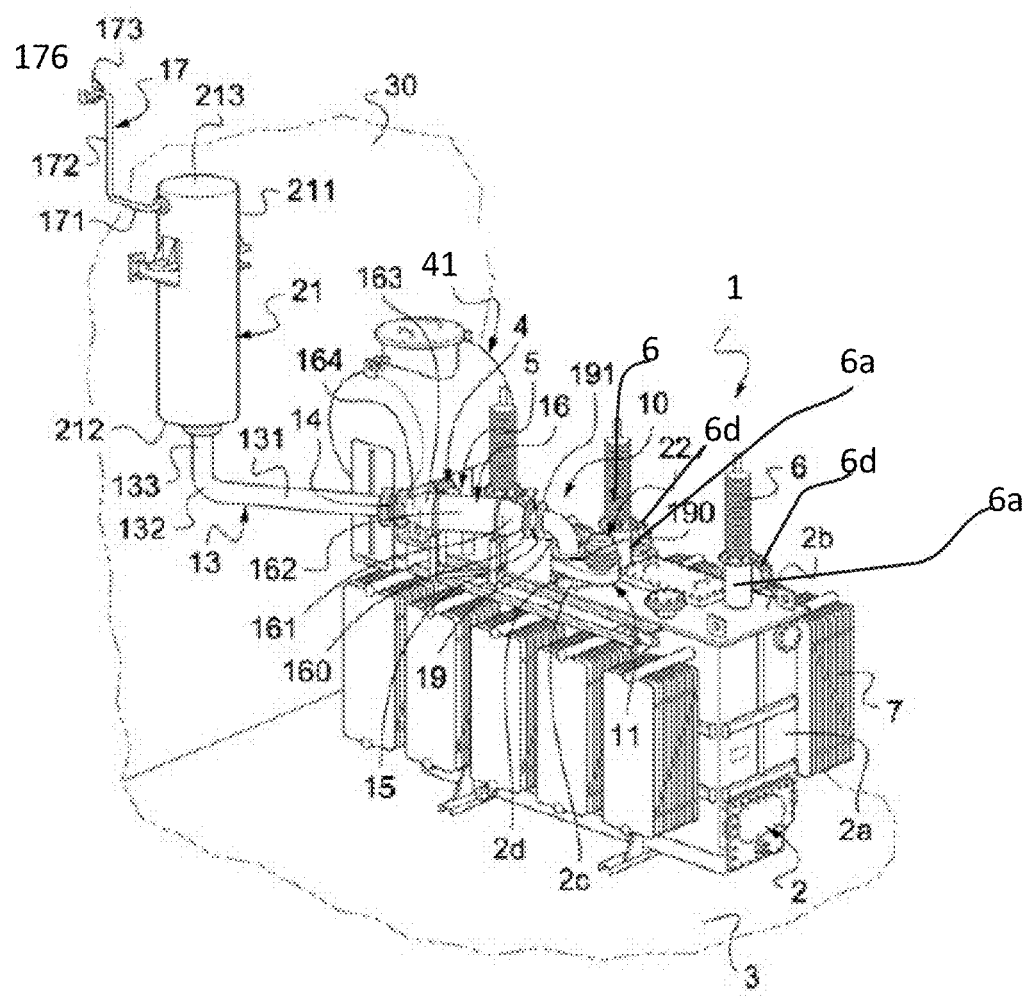
FIG. 3 illustrates in perspective view a transformer equipped with a second device or system for preventing explosion of electrical transformers according to further principles disclosed herein.

As illustrated in figures FIG. 2 and FIG. 3, a transformer (1) includes a transformer tank (2) resting on the transformer ground (3). Transformer (1) is supplied with electrical energy by electrical lines surrounded by high voltage electrical bushings (6). Transformer tank (2) includes transformer tank walls (2a) on bottom and lateral faces and transformer tank upper wall (2b), which is also called a transformer tank cover.

Transformer tank (2) is filled with coolant fluid, for example dielectric oil. To ensure a constant level of coolant fluid in transformer tank (2), transformer (1) is equipped with a conservator (41) connected to transformer tank (2) by a conservator pipe (4).

The conservator pipe (4) is designed with an automatic shutter valve (5) which shuts off the conservator pipe (4) as soon as a rapid movement of the coolant fluid occurs from the conservator (41) to the transformer tank (2). This situation generally occurs during an accidental opening of transformer tank (2) provoking its depressurization. Then, the pressure in the conservator pipe (4) falls abruptly causing the coolant fluid to start flowing, which flow is rapidly stopped by the closure of the automatic shutter valve (5). Thus, the coolant fluid contained in the conservator (3) is prevented from being drained during depressurization of the transformer tank (2).

The transformer (1) comprises heat dissipator (7) including one or more radiators for cooling the coolant fluid. Here, on FIG. 2 and FIG. 3 the heat dissipator (7) is mounted on a lateral face of the transformer tank walls (2a). The heat dissipator (7) is in coolant fluid communication with transformer tank (2). The heat dissipator (7) has a developed radiator surface in contact with ambient air significantly greater than the surface of the geometrical envelope of the same. The heat dissipator (7) may include one or several pumps to circulate the coolant oil between the dissipator (7) and the transformer tank (2). One or several fans can also be included in the heat dissipator (7) to enhance heat exchange with ambient air.

Transformer tank (2) may also be equipped with one or more fire detectors, for example fitted on the transformer upper tank wall (2b).

A very small defect in the transformer electrical insulation may result in a small discharge of vapor from the coolant fluid inside the transformer tank (2). Therefore, transformer tank (2) may include a sensor called Buchholz relay for detecting the presence of vapor from the coolant fluid. The Buchholz relay is fitted at a higher point on a transformer tank (2), for example, in the conservator pipe (4). Other vapor sensors or measurement devices can also be used to detect minor transformer insulation defects creating heat points leading to coolant fluid electrical insulation gas emissions, but these sensors have a longer response time delay than the Buchholz. A Buchholz may also include a fluid displacement sensor.

Transformers are powered by power cubicles including power cut-off means such as circuit breakers equipped with triggering sensors. Generally, power cut-offs by circuit breakers are triggered by electrical and mechanical sensors on transformers, or by other neighboring or remote apparatuses. Through the transformer upper wall (2b), the transformer tank outlet (2c) comprises a tubular portion ending with a radial transformer tank outlet flange (2d) located above the transformer upper wall (2b).

Transformer tank outlet flange (2d) is the most common tank opening available in all transformer tanks designed to gas-tightly cooperate with a static spring pressure relief valve (22) configured to open above a static pressure threshold. The transformer tank outlet flange (2d) is designed with holes for bolts.

With reference to FIG. 2 and FIG. 3, a device (10) for preventing explosion of electrical transformers shown in FIG. 1 is fitted on the transformer tank outlet flange (2d) of the transformer tank outlet (2c) of the transformer tank (2) arranged at a high point thereof, for example at the upper wall (2b).

The device (10) for preventing explosion of electrical transformers comprises an adaptor (11) connected to the transformer, but here only the connection through the adaptor (11) is presented arranged along a horizontal lengthwise axis. As a variant, and as described in more detail below, the lengthwise axis of the adaptor (11) may be slightly sloped.

The transformers illustrated in FIG. 2 and FIG. 3 also include three transformer high voltage electrical bushings (6). Generally, transformers are triphasic with three high voltage bushings but can be monophasic with one high voltage electrical bushing (6) per transformer. For high voltage bushings (6), transformers have connection boxes to connect bushings at their base with the transformer windings called "bushing oil cable box" (BOCB) (6a) or "bushing turrets" (BT) (6a) often designed with BOCB or BT flanges (6d) either for holding a static a pressure Relief Valve (20) or for inspection allowing a mechanical connection with the device (10) for preventing explosion of electrical transformers. As would be easily understand by one having ordinary skill in this art after reading this specification, in such a case a respective device (10) would be attached to a BT or BOCB flange (6d) in substantially the same way as the device (10) is attached to the transformer static pressure relief valve (22) flange (2d). A respective adaptor (11) would be fixed on each of the three BOCB or BT flanges (6d) by being bolted to their respective adaptor (11) first drilled interface (111). The remaining structure of the device (10) for a BT or BOCB (6a) attached to a flange (6d) would be the same.

The adaptor (11) forms an interface between transformer tank (2) and other members of device (10) for preventing explosion of electrical transformers as described below. The adaptor (11) shown in FIG. 1a and FIG. 1b includes a first vertical axis being the same axis as the transformer tank outlet (2c) and the transformer tank outlet flange (2d) of transformer tank (2), first and second rounded ends each having a vertical wall, with the first vertical axis being the same axis as the first rounded end as shown in FIG. 1a and FIG. 1b, and a second vertical axis being located at the other rounded end as shown in FIG. 1 and FIG. 1a.

Figure 1A:
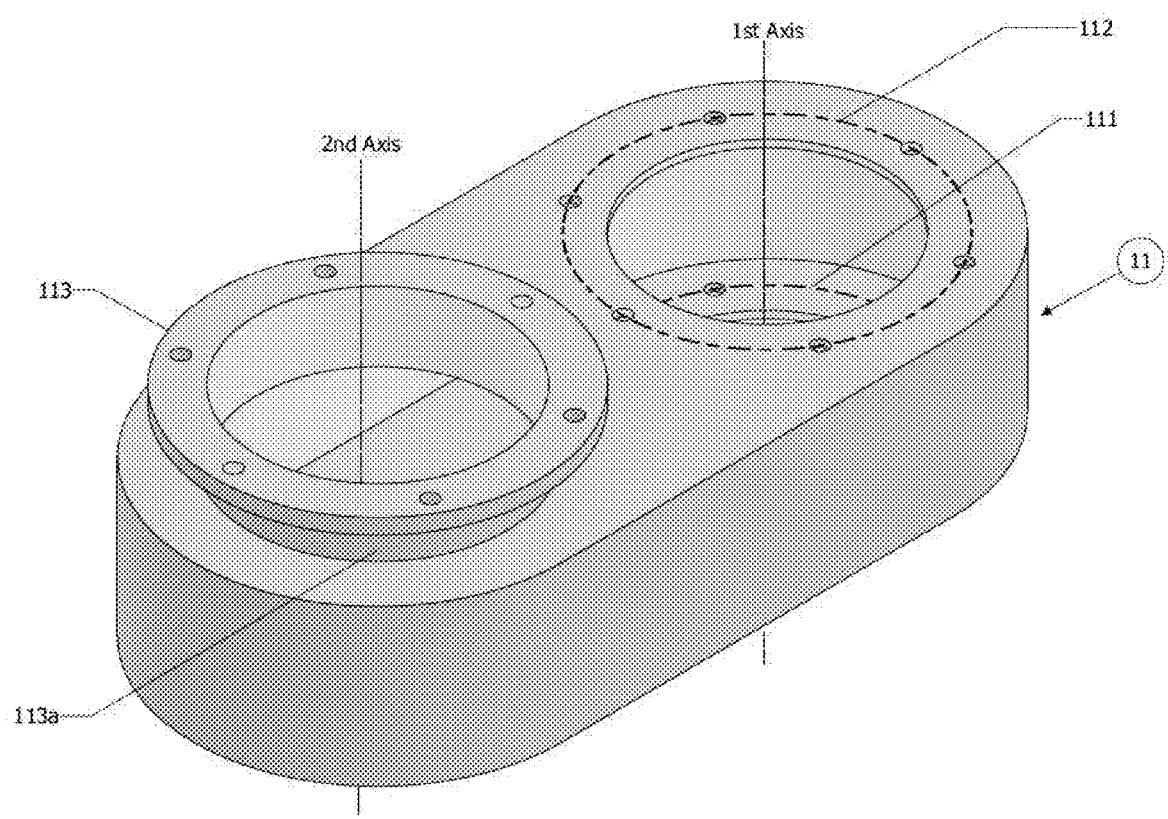
FIG. 1a illustrates in perspective view an adaptor for a device for preventing explosion of electrical transformation in accordance with further principles disclosed herein.
Figure 1B:
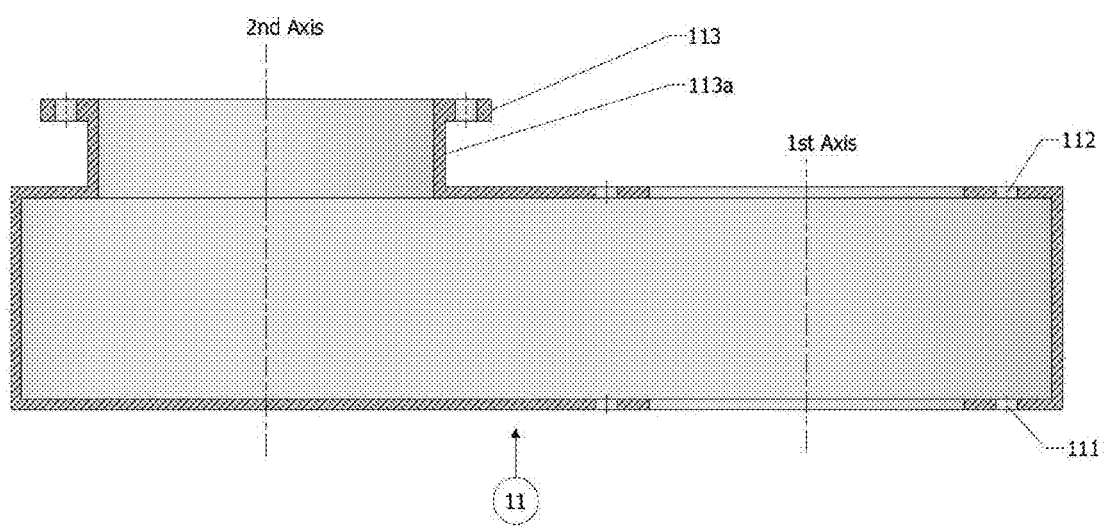

As shown in FIG. 1a and FIG. 1b, the adaptor (11) has a cross section in a vertical plane, the cross section being rectangular comprising parallel lateral walls and parallel upper and lower walls, the lower wall facing the transformer upper wall (2b). The adaptor (11) has a length greater than the width between the lateral walls, and the width of the adaptor (11) is greater than the height between the upper and lower walls. The rounded ends may be manufactured from a steel tube and walls from steel plates, for example galvanized steel or stainless-steel tubes and plates.

In an embodiment, the adaptor (11) shown in FIG. 1a and FIG. 1b includes:
  On the first vertical axis lower wall, a first drilled interface (111) allowing the adaptor (11) to be tightly assembled to the transformer tank outlet flange (2d) of the transformer tank outlet (2c) of the transformer tank (2). For this purpose, the first drilled interface (111) is designed with the same number of holes, diameter, and distribution as those of transformer tank outlet flange (2d).
  On the first vertical axis higher wall, a second drilled interface (112) allowing the adaptor (11) to be tightly assembled to the device (10) for preventing explosion of electrical transformers as shown in FIG. 1. For this purpose, the second drilled interface (112) is designed with the same number of holes, diameter, and distribution as those of angle elbow inlet flange (190) for being bolted together.

The first drilled interface (111) for transformer tank outlet flange (2d) and the second drilled interface (112) for angle elbow inlet flange (190) are spaced apart from each other, have a common axis, hereinafter named first axis, and are placed in the adaptor (11) first rounded end that may be coaxial.

On the second vertical axis, an adaptor outlet (113a) having an adaptor outlet flange (113) is placed on the adaptor (11) second rounded end and are coaxial. The adaptor outlet flange (113) is designed to gas-tightly cooperate with a static spring pressure relief valve (22) configured to open above a static pressure threshold.

The second axis of the adaptor outlet flange (113) and the first axis of drilled interfaces (111) and (112) are parallel.

The internal diameter of the first drilled interface (111) and second drilled interface (112) for transformer tank outlet flange (2d) and angle elbow inlet flange (190) defines the adaptor (11) passage for fluid communication between each, therefore the diameters of the second drilled interface (112) and angle elbow inlet flange (190) should be at least equal to or greater than the diameter of first drilled interface (111) and transformer tank outlet flange (2d).

In an embodiment, the lower wall of the adaptor (11) shown in FIG. 1a and FIG. 1b includes the first drilled interface (111) for the flange (2d) having the following characteristics:
  Lies facing downward within a horizontal plane of the first vertical axis,
  Has concentric inner and outer diameters,
  Is provided with regularly spaced holes to fix the adaptor (11) shown in FIG. 1a and FIG. 1b to the flange (2d) of the transformer tank (2).

In an embodiment, the upper wall of the adaptor (11) shown in FIG. 1a and FIG. 1b includes the second drilled interface (112) with the following characteristics:
  Lies facing upward within a horizontal plane of the first vertical axis,
  Has concentric inner and outer diameters,
  Is provided with regularly spaced holes to fix angle elbow inlet flange (190) of device (10) for preventing explosion of electrical transformers as shown in FIG. 1.

In an embodiment, the adaptor (11) shown in FIG. 1a and FIG. 1b comprises an adaptor outlet (113a) with the adaptor outlet flange (113) placed on a second axis above the upper wall of the adaptor (11) ending by an annular section. The adaptor outlet flange (113) fitted on the second axis of the adaptor (11) has the following characteristics:
  Lies facing upward within a horizontal plane with the adaptor (11) vertical second axis,
  Is provided with same spaced holes for being fixed by bolts to the static spring pressure relief valve (22) configured to open above a static pressure threshold from device (10) as shown in FIG. 1,
  Has a concentric and at least same or bigger inner and outer diameters than the transformer tank outlet flange (2d).

The internal diameters of the adaptor (11) shown in FIG. 1a and FIG. 1b drilled interfaces (111) and (112), and adaptor outlet flange (113) may be equal to but not smaller than the internal diameter of the transformer tank outlet flange (2d). The internal diameters may be between 100 mm and 350 mm, preferably between 120 mm and 210 mm, for example 152.4 mm.

In the embodiments of FIG. 1, FIG. 2 and FIG. 3, device (10) for preventing explosion of electrical transformers includes an angle elbow (19) that has the following characteristics:
- An angle elbow inlet flange (190), an angle elbow outlet flange (191) and an angle bent body (192) therebetween, all having the same diameter,
- This same diameter being equal or greater than the diameter of the overly high transient oil pressure release member (15).

In the embodiments of FIG. 1, FIG. 2 and FIG. 3, device (10) for preventing explosion of electrical transformers includes the angle elbow (19) arranged between the adaptor (11) and an overly high transient oil pressure release member (15). The device (10) angle elbow inlet flange (190) is connected to the second drilled interface (112) of the adaptor (11), for example by bolts. The device (10) angle elbow outlet flange (191) is connected to the inlet of the overly high transient oil pressure release member (15). Downstream, the outlet of the overly high transient oil pressure release member (15) of the device (10) is connected to a diffuser (16) by a diffuser inlet flange (160).

As can be seen and appreciated, the bolts securing the angle elbow inlet flange (190) to the adaptor (11) may extend through the transformer tank outlet flange (2d) thereby serving to secure not only the angle elbow inlet flange (190) to the adaptor (11), but also the adaptor (11) to the transformer tank outlet flange (2d).

Figure 5:
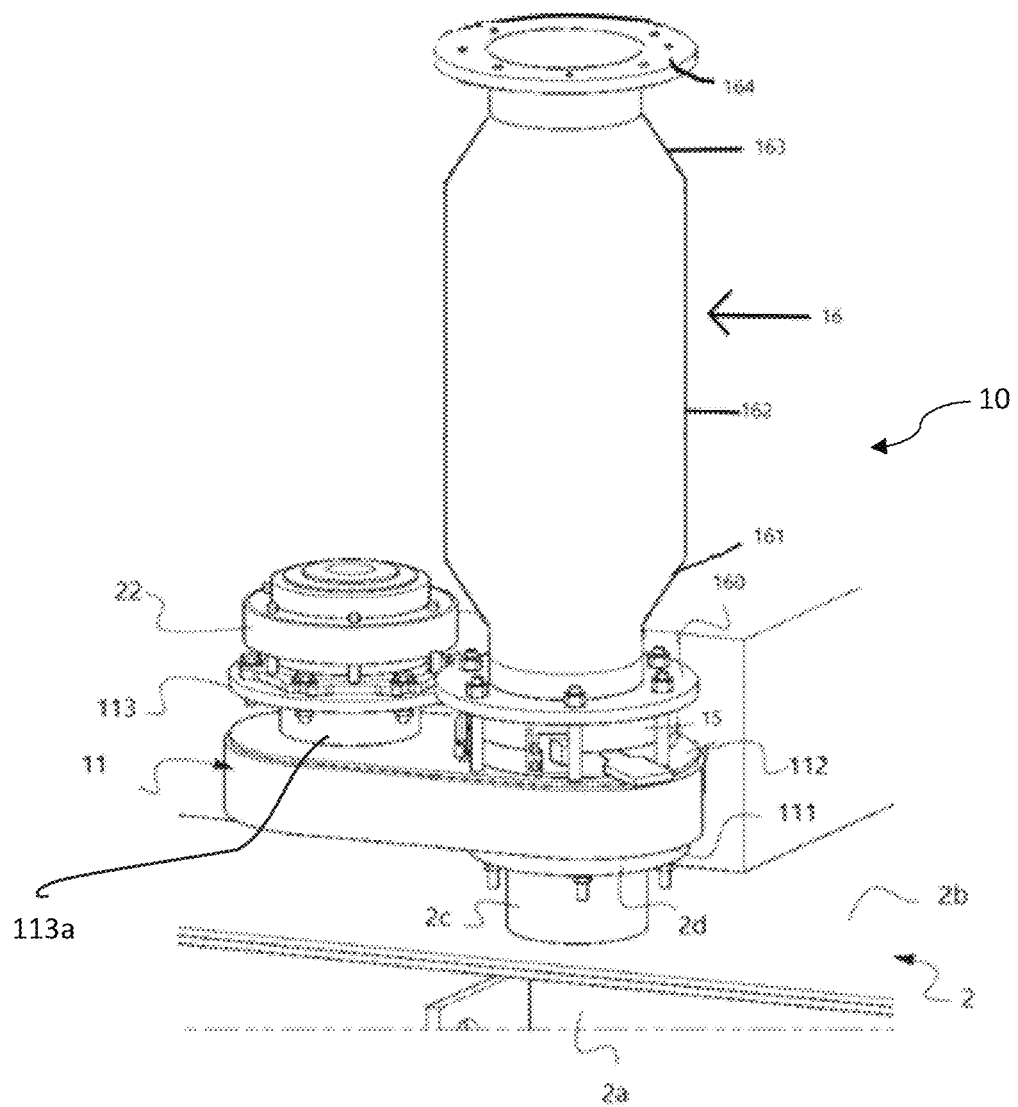
FIG. 5 illustrates in perspective view a third device or system for preventing explosion of electrical transformers according to further principles disclosed herein.

The device (10) for preventing explosion of electrical transformers comprises an overly high transient oil pressure release member (15) and may have a structure as described in U.S. Pat. No. 6,804,092 or 8,2604,804. The inlet face of the overly high transient oil pressure release member (15) may be fitted on the angle elbow outlet flange (191), as shown in FIG. 1, or directly on the second drilled interface (112) of the adaptor (11) as shown in FIG. 5.

During normal use, the overly high transient oil pressure release member (15) is subjected:
- To the pressure inside the adaptor (11) on the inlet face of the overly high transient oil pressure release member (15), such pressure being equal to the transformer tank (2) pressure,
- To atmospheric pressure on the outlet face of the overly high transient oil pressure release member (15),
- During normal transformer operation, the pressure inside the transformer tank (2) corresponds to the atmospheric pressure at the top of the conservator (3) plus the cooling oil height at lower points.

The opening of the overly high transient oil pressure release member (15) is used to detect, without delay, an overly high transient cooling fluid pressure increase inside the transformer tank caused by a break in the transformer electrical insulation. The overly high transient oil pressure release member (15) depends on the transformer design and may be set to open at a determined transient pressure of less than 1 bar, for example between 0.8 bar and 1.6 bar of differential transient pressure.

Figure 6:
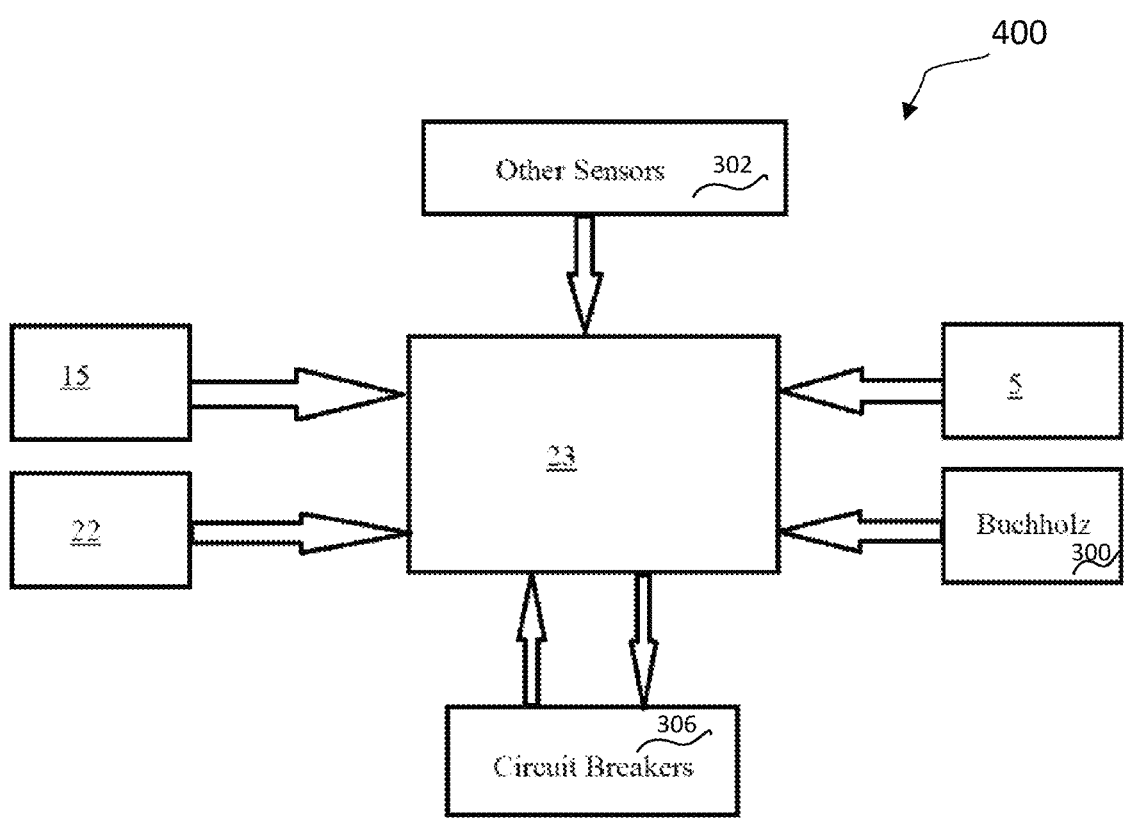
FIG. 6 is a schematic view of a control system and its data/information connections with a device or system for preventing explosion of electrical transformers employing further principles disclosed herein.

The overly high transient oil pressure release member (15) may comprise a rupture disk such as one described in U.S. Pat. No. 6,804,092 or 8,264,804. The rupture disk may be concave or convex on the inlet face. The overly high transient oil pressure release member (15) is configured to open suddenly due to rupture disk breakage when the transient pressure in the tank increases above a transient threshold pressure, which depends on the transformer mechanical robustness and design. The rupture disk of the overly high transient oil pressure release member (15) may be equipped with an electrical wire configured to break when the disk starts opening by rupture or break. The state of this electrical wire, intact or broken when the disk opens, may be monitored by the cubicle or the relay box as shown in FIG. 6.

The overly high transient oil pressure release member (15) is a passive mechanical device that can be equipped with monitoring members.

In the embodiments illustrated in FIG. 2 and FIG. 3, the device (10) for preventing explosion of electrical transformers prevention includes a single diffuser (16) connected to:
- The second drilled interface (112) of the adaptor (11) of device (10) via the angle elbow inlet flange (190), the angle elbow bend body (192), the angle elbow outlet flange (191), and the overly high transient oil pressure release member (15) positioned between the angle elbow outlet flange (191) and the diffuser (16) as described above, and
- The angle elbow outlet flange (191) is attached to the inlet of the overly high transient oil pressure release member (15) and the outlet of the overly high transient oil pressure release member (15) is attached to the diffuser inlet flange (160),
- The diffuser (16) itself being positioned either above the transformer tank upper wall (2b) and/or above the transformer heat dissipator (7).

In an embodiment, the device (10) for preventing explosion of electrical transformers comprises the diffuser (16). As shown in FIG. 2 and FIG. 3, the diffuser (16):
- Is fitted downstream of the overly high transient oil pressure release member (15),
- Comprises a diffuser inlet flange (160), a diverging wall (161), a cylindrical wall (162), a converging wall (163) and an outlet flange (164),
- Is arranged on a third axis in common with the diffuser inlet flange (160) and the diffuser outlet flange (164),
- Has a diverging wall (161) and converging wall (163) that may have a conical shape,
- Has a cylindrical wall (162), aligned along and concentric about the third axis that may be horizontal with an internal diameter greater than the internal diameter of the overly high transient oil pressure release member (15), diffuser inlet flange (160) and diffuser outlet flange (164), The internal diameter of the cylindrical wall (162) may at least be double the diameter of the overly high transient oil pressure release member (15), The diffuser inlet flange (160), the diverging wall (161), the cylindrical wall (162), the converging wall (163) and the diffuser outlet flange (164) may be made of galvanized steel and may be welded.

According to the embodiment of FIG. 5, device (10) for preventing explosion of electrical transformers may be designed with a diffuser (16) oriented vertically along the first axis. In this case, the diffuser inlet flange (160) may be directly connected to the outlet of the overly high transient oil pressure release member (15) which is directly connected on its inlet face to the adaptor (11) second drilled interface (112). The angle elbow (19) may be arranged downstream of the diffuser (16) connected to the diffuser outlet flange (164), for example, by bolts.

While not illustrated, it can be appreciated that in the embodiment of FIG. 5, an angle elbow (19) with an angle elbow inlet flange (190) would be bolted to a diffuser outlet flange (164). A duct (13) would be connected to be in communication with the angle elbow outlet flange (191) to conduct an oil and flammable gas mixture away from the angle elbow (19). As described next, a shock absorber (14) may be positioned between the angle elbow (19) and the duct (13).

In an embodiment, a shock absorber (14) is installed after the diffuser (16) and is fitted on the diffuser outlet flange 164:

- The shock absorber (14) is included in the device (10) for sharply reducing the very vigorous transformer shocks provoked by internal electrical rupture of insulation which produce an immediate strong explosive gases generation. The shock absorber (14) is therefore designed to avoid breakage of duct, pipes, gaskets, etc. during transformer short circuits, which would render the device (10) useless for preventing explosion of electrical transformers.
- The shock absorber (14) comprises an inlet flange, an outlet flange, and an elastic sleeve mounted between the inlet and outlet flanges. Bolts may be provided around the shock absorber (14) for clamping the diffuser outlet flange (164) and the inlet flange of the duct (13).
- For the embodiment of FIG. 5, device (10) for preventing explosion of electrical transformers designed with a vertical diffuser (16), the shock absorber (14) may be arranged directly downstream fixed on the diffuser outlet flange (164) or fixed farther downstream to the angle elbow outlet flange (191).
- During transformer normal operation, the shock absorber (14) is also reducing the inherent mechanical tank vibrations provoked by high-voltage electrical frequencies, thereby reducing metal fatigue during scheduled ten's years of service.

In an embodiment, the device (10) for preventing explosion of electrical transformers comprises a duct (13) with a first duct pipe (131):

- The first duct pipe (131) is always installed along the third axis including the diffuser (16) and the shock absorber (14).
- The first duct pipe (131) comprises an inlet flange for being assembled to the outlet flange the shock absorber (14), for example by bolts.
- The diffuser (16), the shock absorber (14) and the first duct pipe (131) are always slightly inclined up relative to horizontal to enable the cooling oil to return into the transformer after a transformer explosion has been prevented.
- The shock absorber (14) can be installed upstream or downstream of the diffuser (16).
- If a shock absorber (14) is not installed for instance for low power transformers, the first duct pipe (131) may be fixed directly downstream from the diffuser outlet flange (164) of the diffuser (16).

In an embodiment, the duct (13) includes downstream of the first duct pipe (131) a duct elbow (132) that may have an angle of 90° exhausting down as shown in FIG. 2 or exhausting up as shown in FIG. 3. The duct elbow (132) may be adjusted to different angles depending on site requirements, for example 30°.

In an embodiment, downstream of the duct elbow (132), a second duct pipe (133) may be exhausting down as shown in FIG. 2 or exhausting up as shown in FIG. 3.

The duct (13) including the first duct pipe (131), the duct elbow (132) and the second duct pipe (133) may include the following components or characteristics:

- A constant diameter equal to the diameter of the angle elbow (19) and to the diameters of the diffuser inlet flange (160) and diffuser outlet flange (164) as well as to the inlet and outlet flanges diameter of the shock absorber (14).
- Made of galvanized welded steel parts or pipes.

In the embodiment of FIG. 2, the duct (13) outlet is lower than its inlet and the duct elbow (132) and second duct pipe (133) are directed downwards. The outlet of the second duct pipe (133) is directed to an oil sump (134) situated below the transformer ground (3). Then, during the device (10) activation for avoiding transformer explosion:

- Oil flowing therethrough to be evacuated to the oil sump (134) of the transformer ground (3).
- Afterwards, the oil can be pumped out from the oil sump (134) for appropriate processing, for example recycling.

In the embodiment of FIG. 3, the first duct pipe (131) outlet is higher than its inlet and the duct elbow (132) and second duct pipe (133) are directed upward. The outlet of the second duct pipe (133) is connected downstream at the bottom of an elevated oil and gas divider called a separator (21) attached to a nearby wall (30). In this case, the duct (13) inlet from the diffuser (16) is lower than its outlet in the separator (21). The separator (21) comprises a cylindrical wall (211) oriented vertically, a bottom wall (212), a top wall (213), and an explosive and flammable gas evacuation pipe (17) mounted downstream of the separator (21).

In an embodiment, the separator (21) is fixed on the transformer ground (3). In this case, the duct elbow (132) and second duct pipe (133) are directed downwards and the outlet of the second duct pipe (133) is connected at the top of the separator (21).

In the embodiment of FIG. 3, the explosive and flammable gas evacuation pipe (17) is configured to evacuate the explosive and flammable gases from the separator (21) after the opening of the overly high transient oil pressure release member (15) following a cooling fluid pressure increase caused by a break of the transformer electrical insulation. The explosive and flammable gas evacuation pipe (17) is:

- Designed to let explosives and flammable gases flow away from the separator (21),
- Fitted downstream of the separator (21),
- Connected to the vertically oriented cylindrical wall (211), but very near to the top wall (213) of the separator (21),
- Configured to channel explosive and flammable gases far away from people living, working, or passing by surrounding areas, as well as from onsite installations,
- Made of steel tubes, all portions having the same tube diameter preferably between 25 mm and 50 mm.

In the embodiment of FIG. 3, the explosive and flammable gas evacuation pipe (17) may comprise:

- A first portion (171) connected horizontally but slightly inclined downward the separator (21) for possible oil drops to return to the separator (21).
- A second vertical portion (172) connected to the first portion (171) by a right-angle tube.
- A third portion (173) connected also slightly inclined downward to the separator (21) by a right-angle tube to the second portion (172). The third portion (173) comprises an upstream end from all other portions and the separator (21).

The first portion (171) and second portion (172) allow for the explosive and flammable gas to be channeled to outside limits of living areas such as concrete walls or fences for being exhausted far away from people homes, working places, or passing by areas, as well as from onsite installations.

The first portion (171), second portion (172), and third portion (173) of the explosive and flammable gas evacuation pipe (17) may be fixed to nearby concrete walls or fence posts. For instance, as shown on FIG. 3 and FIG. 4 the third portion (173) may be supported by a leg (18) held on the top of a wall (30) dividing the transformer (1) from other site equipment.

The end of the explosive and flammable gas evacuation pipe (17) may comprise a conical tube portion (174) downstream of the third portion (173) and connected to a large diameter flange (175), all welded with flanges assembled by bolts.

Figure 4:
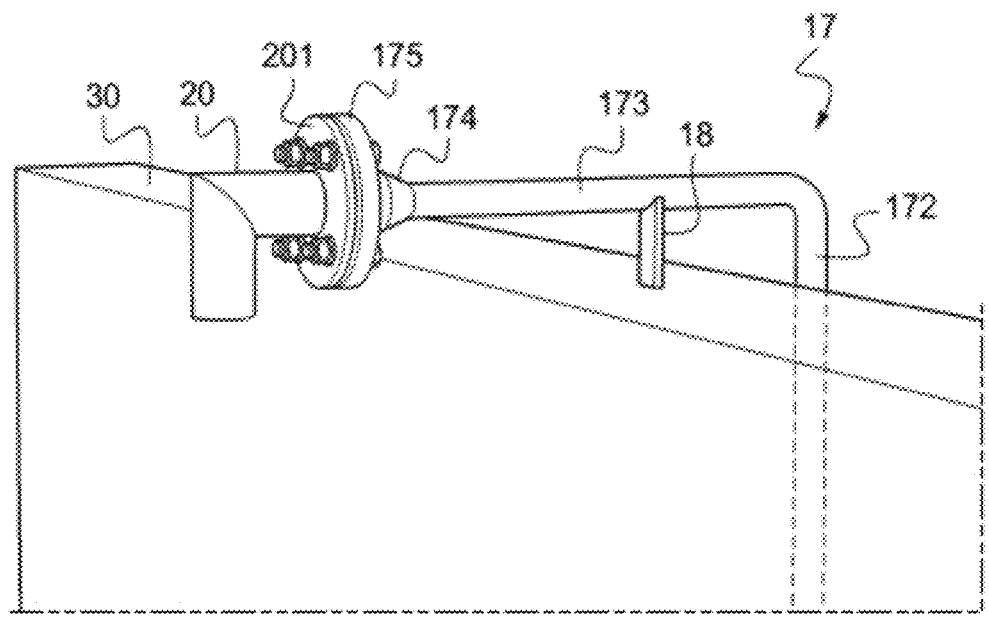
FIG. 4 is a detailed view of as aspect of the second device or system for preventing explosion of electrical transformers of FIG. 3.

As shown on FIG. 4, device (10) for preventing explosion of electrical transformers includes an air isolation shutter (20) mounted on the end of the explosive and flammable gas evacuation pipe (17). The air isolation shutter (20) is equipped with flange (201) assembled to flange (175) of the explosive and flammable gas evacuation pipe (17). The air isolation shutter (20):

Prevents air going into the explosive and flammable gas evacuation pipe (17),
Communicates with the ambient atmosphere for evacuating gases channeled by the explosive and flammable gas evacuation pipe (17),
Is designed for low head losses when gases are flowing to the atmosphere,
Has a free end that faces the transformer ground (3) and evacuates the explosive and flammable gases towards the transformer ground (3).
Has a diameter greater than the diameter of the explosive and flammable gas evacuation pipe (17), preferably the air isolation shutter (20) has a diameter equal or greater than 50 mm.

In an embodiment, as indicated in FIG. 3, a flame arrester (176) can be added to the air isolation shutter (20).

In FIG. 6, there is illustrated in schematic form a control unit 23 capable of monitoring the operation of the device (10). The control unit 23 is equipped with information processing means capable of receiving signals from the overly high transient oil pressure relief member (15), the Buchholz relay (300), the automatic shutter valve (5), the static pressure relief valve (22) and from other sensors (302) for eventually transmitting the signal for tripping the transformer circuit breaker (306). The control unit 23 may also be connected to the transformer Buchholz relay (300) and static pressure relief valve (22) for triggering a preventive fire extinguishing process.

As shown on FIGS. 1, 2, 3, and 5, the device (10) for preventing explosion of electrical transformers comprises a static spring pressure relief valve (22) mounted on the adaptor outlet flange (113) tightly fitted to the adaptor (11) shown in FIG. 1a and FIG. 1b. The static spring pressure relief valve (22):

May have a structure as described in U.S. Pat. No. 7,210,497.
Includes a plurality of bolts to be gas-tightly secured to the adaptor outlet flange (113),
Comprises a spring biased disc closed under normal conditions and configured to open at a pressure threshold to evacuate a slow excess of static pressure.

The greatest interest of the adaptor (11) is to allow using the often-single transformer tank outlet of the static spring relief valve (22) for mounting the device (10) for preventing explosion of electrical transformers. Simulations and tests have shown that:

The opening time of the static pressure spring relief valve (22) is not significantly delayed by the adaptor (11).
During transformer short circuits, the overly high transient oil pressure release member (15) opening time is much faster because static pressure must be built in the transformer tank before the static spring pressure relief valve (22) starts opening.
The opening by breakage of the overly high transient oil pressure release member (15) occurs much before the opening of the static spring pressure relief valve (22).

The other greatest interest of the adaptor (11) is to allow using the often-single transformer tank outlet of the static spring pressure relief valve (22) for mounting the device (10) for preventing explosion of electrical transformers without needing to modify new standard transformers or without any onsite machining in-service transformers. Therefore, transformer security can be improved at much lower costs. For instance, there is no need for supplementary transformer tests that are often requested after design modifications or machining, which reduces modification and adaptation costs.

After activation of device (10) for preventing explosion of electrical transformers following a break of transformer electrical insulation, transformer tank (2) may include a means for refrigerating overheated metal melted parts in contact with the coolant fluid that can produce more explosive and flammable gases. This means may be achieved by injecting an inert gas at the bottom of the transformer tank (2), thereby forcing the movement of the coolant fluid to avoid warming and further explosive and flammable gases production. The injection of an inert gas may be triggered from a few minutes to a few hours after the opening of the overly high transient oil pressure release member (15). However, a fast action would reduce the explosive and flammable gas production after the break of transformer electrical insulation. The inert gas reservoir is intended to inject inert gas for a period of about 5 minutes to about 60 minutes depending on transformer size. The inert gas injection time should be sufficient for cooling the oil and the internal transformer overheated parts by agitating the oil, thereby stopping gases from being produced by the decomposition of the oil.

The inert gas, for example nitrogen, is stored in a pressurized reservoir equipped with a valve, a pressure reducer and a hose or pipe conveying the gas to the bottom of the transformer tank (2). The pressurized reservoir can be housed in a cabinet, as described in U.S. Pat. No. 6,804,092.

The device (10) overly high transient oil pressure release member (15), the transformer vapor sensor, electrical or mechanical trigger sensors, static pressure spring relief valve (22) are connected to a control unit configured to monitor the device (10) operation to avoid transformer explosions. FIG. 6 shows control unit (23) equipped with information processing means for receiving signals from the sensors and configured to transmit control signals to the transformer circuit breakers and remote systems.

When the overly high transient oil pressure release member (15) opens following an internal rupture of insulation in transformer (1), the fast pressure rise in transformer tank (2) stops and reduces immediately. A jet of explosive and flammable gases along with coolant fluid passes through the overly high transient oil pressure release member (15) and spills into the diffuser (16).

Inventor's experiments and simulations have shown that:

After an opening of the overly high transient oil pressure release member (15), the volume of coolant fluid going into the diffuser (16) is quite small compared to the volume of explosive and flammable gases.

A part of the coolant fluid may return to transformer tank (2) by gravity because along the third axis the diffuser (16), the shock absorber (14) and the first duct pipe (131) are always slightly inclined up relative to horizontal to enable cooling oil to return into the tank after a transformer explosion has been prevented.

The explosive and flammable gases are ejected from the diffuser (16) to the duct (13) for being released into an oil sump according to FIG. 2 or into the separator (21) according to FIG. 3.

The role of the diffuser (16) is very important during the first milliseconds following the opening of the overly high transient oil pressure release member (15). The diffuser (16) enables a very sharp fall in the transformer tank (2) pressure when the overly high transient oil pressure release member (15) opens because the diffuser (16) is designed for reducing extremely quickly transient pressures for avoiding static pressure to increase inside the tank, and therefore transformers to explode.

After opening, the overly high transient oil pressure release member (15) can then be replaced safely after inert gas has been injected for avoiding the bazooka effect possibly killing technicians if the explosive and flammable gases were to remain in the transformer tank and come into contact suddenly with air (oxygen).

Tests have been performed on a 50 MVA transformer equipped with device (10) for preventing explosion of electric transformers. The 90° angle elbow bent body (192) was mounted directly on the transformer tank (2). The diffuser (16), shock absorber (14) and the duct (13) were mounted on a horizontal third axis channeling the explosive and flammable gases to a separator (21) fixed on the transformer ground (3). In this case, the duct elbow (132) and second duct pipe (133) were directed downwards for being connected at the top of the grounded separator (21), which was equipped downstream with an explosive and flammable gas evacuation pipe (17). The tests were performed with increased arc energies up to 3.97 MJ. For this stronger arc energy, the RMS (root square) voltage at no load was 16 kV and the arc current 25 kA with a fault duration of eighty-nine millisecond. A maximum of 3.97 MJ arcing internal tank load corresponds to an IEEE Applied Arc Energy of 55 MJ seen in a 345 kV voltage class transformer* usually occurring in transformers size much larger than 50 MVA. (*IEEE Std C57.156-2016, "IEEE Guide for Tank Rupture Mitigation of Liquid-Immersed Power Transformers and Reactors" 2016). During all tests, the transformer tank was preserved without any subsequent leak. The overly high transient oil pressure release member (15) released pressure after the occurrence of internal arcs voluntarily controlled for the purpose of the tests.

When costs and budgetary matters are prohibitive for providing security to people living or working close to transformers, the inventors discovered that there is a need for an efficient and compact explosion prevention device to protect transformers with standard or existing transformer tank (2) openings. The device (10) presented here for preventing explosion of electrical transformers is:

using transformer tank outlet flange (2d) and BOCB or BT flanges (6d), the most common tank openings available in all transformer tanks designed to gas-tightly cooperate with static spring pressure relief valves.

detecting transformer electrical insulation ruptures extremely quickly and simultaneously acting to limit resulting consequences by avoiding transformer explosions and fires.

As can be appreciated from the foregoing, when the device (10) is in use, an insulating oil fills the adaptor (11) and, at least for the embodiments of FIGS. 1, 2 and 3, the angle elbow (19); the overly high transient oil pressure release member (15) is configured to open in response to an explosive overly high transient surge in oil pressure and allow the oil and flammable gas mixture to flow into the diffuser (16); the overly high transient oil pressure release member (15) is set to open at an oil pressure that is higher than that at which the transformer static spring pressure relief valve (22) opens because the static spring pressure relief valve (22) is not designed to react to an overly high transient oil pressure; the diffuser (16) receives the oil released upon opening of the overly high transient oil pressure member (15) and quickly facilitates depressurization of the oil inside the transformer tank (2).

While numerous embodiments have been shown and described herein, it will be obvious to those skilled in the art that such embodiments are provided by way of example only. It is not intended that the description be limited by the specific examples provided within the specification. While the embodiments have been described with reference to the specification, the descriptions and illustrations of the embodiments herein are not meant to be construed in a limiting sense. Numerous variations, changes, and substitutions will now occur to those skilled in the art without departing from the disclosed embodiments. Furthermore, all aspects of the invention are not limited to the specific depictions, configurations or relative proportions set forth herein which depend upon a variety of conditions and variables. It should be understood that various alternatives to the embodiments described herein may be employed, individually or in combination, in practicing the invention. It is therefore contemplated that the embodiments shall also cover any such alternatives, modifications, variations, or equivalents. It is intended that the following claims define the scope of the invention and that methods and structures within the scope of these claims and their equivalents be covered thereby.

What is claimed is:

1. An adaptor (11) for an electrical transformer explosion prevention device comprising:
   in cross section, an upper wall and a lower wall spaced from the upper wall;
   a first drilled interface (111) in a first region of the lower wall;
   a second drilled interface (112) in a first region of the upper wall, the first drilled interface and the second drilled interface being concentric with a first axis;
   a first set of bolt holes positioned about the first drilled interface (111) and a second set of bolt holes positioned about the second drilled interface (112), the first set of bolt holes and the second set of bolt holes being aligned such that the adaptor (11) can be secured to a transformer tank outlet flange (2d) of a transformer tank outlet (2c) initially structured to host a static spring pressure relief valve, and with the first drilled interface (111) in fluid communication with the transformer tank outlet (2c); and an adaptor outlet (113a) with an adaptor outlet flange (113) secured to the body at a second region of the upper wall and concentric with a second axis, the adaptor outlet (113) having a third set of bolt holes with which a static spring pressure relief valve (22) can be attached to the adaptor outlet flange member (113a).

2. The adaptor (11) of claim 1, wherein the second drilled interface (112) and adaptor outlet flange (113) are coplanar.

3. The adaptor (11) of claim 1, wherein the first axis and the second axis are parallel to each other.

4. The adaptor (11) of claim 1, wherein, the adaptor outlet flange (113) in the second axis and the first drilled interface 111 and second drilled interface (112) in the first axis are in parallel planes.

5. The adaptor (11) of claim 1, wherein in the first axis the second drilled interface (112) has a same or larger inner diameter than an inner diameter of the first drilled interface (111).

6. A device (10) for preventing explosion of an electrical transformer due to overly high transient oil pressure comprising:
- an adaptor (11) as set forth in claim 1, the adaptor (11) coupled to a transformer tank outlet flange (2d) of a transformer tank outlet (2c) with the first drilled interface (111) in fluid communication with the transformer tank outlet (2c);
- a static spring pressure release valve (22) coupled to the adaptor outlet (113a) and the adaptor outlet flange (113);
- an angle elbow (19) with an angle elbow inlet flange (190) bolted by means of bolts to the adaptor second drilled interface (112) for securing the adaptor (11) to the transformer tank outlet flange (2d) bolted to the first drilled interface (111);
- an overly high transient oil pressure release member (15) coupled to and in fluid communication at its inlet face with an angle elbow outlet flange (191) of the angle elbow (19);
- a diffuser (16) with a diffuser inlet flange (160) attached to the outlet of the overly high transient oil pressure release member (15);
- a duct (13) attached to the diffuser outlet flange (164) and capable of conducting an oil and flammable gas mixture away from the transformer tank (2) when the overly high transient oil pressure release member (15) opens; and
- at least one shock absorber (14) located upstream or downstream of the diffuser (16) to eliminate very vigorous transformer shocks produced by immediate strong explosive gases generation provoked by internal rupture of insulation in the transformer (1), the shock absorber (14) being designed to avoid breaking of pipes, ducts, or gaskets because of shocks which would render useless the device (10) for preventing explosion of electrical transformers, wherein,
- an isolating oil fills the adaptor (11) and the angle elbow (19) up to the inlet face of the overly high transient oil pressure release member (15),
- the device (10) is activated following a transformer short-circuit,
- the overly high transient oil pressure release member (15) opens by transformer tank (2) overly high transient oil pressures generated by internal rupture of insulation in the transformer (1),
- the overly high transient oil pressure release member (15) is configured to open in response to an explosive overly high transient surge in oil pressure and allow the oil and flammable gas mixture to flow into the diffuser (16),
- the overly high transient oil pressure release member (15) is set to open at an oil pressure that is higher than that at which the transformer static spring pressure relief valve (22) opens because the static spring pressure relief valve (22) is not designed to react to an overly high transient oil pressure, and
- the diffuser (16) receives the oil and gas mixture released upon opening of the overly high transient oil pressure member (15) and quickly facilitates depressurization of the oil inside the transformer tank (2) to avoid its explosion.

7. The device (10) of claim 6, further comprising an oil sump (134) on a transformer ground (3), wherein:
(a) the duct (13) includes a horizontal first duct pipe (131), a duct elbow (132) and a second duct pipe (133) that extends vertically downward;
(b) the first duct pipe (131) is in fluid communication with the duct elbow (132) and the second duct pipe (133) to direct oil downward to the oil sump (134) in the transformer ground (3) by way of the second duct pipe (133); and
(c) in use during a transformer short-circuit, the oil and flammable gas mixture ejected from the diffuser (16) is conveyed to an oil sump (134) located on a transformer ground (3) by way of the duct (13), but then the oil remining in the first duct pipe (131) is allowed to return to the diffuser (16) due to a slight downward slope of the first duct pipe (131).

8. The device (10) of claim 6, further comprising a separator (21) fixed on a wall (30) for separating oil from flammable gas in the oil and flammable gas mixture, wherein:
(a) the duct (13) further comprises an horizontal first duct pipe (131), a duct elbow (132) and a second duct pipe (133) that extends vertically upward, the first duct pipe (131), the elbow (132) are in fluid communication with the second duct pipe (133);
(b) the second duct pipe (133) is connected to and in fluid communication with the separator (21), and
(c) in use during a transformer short-circuit, the oil and flammable gas mixture ejected from the diffuser (16), is conveyed to the separator (21) by way of the duct (13), but due to a slight downward slope down of the first duct pipe (131) the oil is allowed to return to the diffuser (16) from the separator (21) after the flammable gases have been separated from the oil in the flammable gas mixture in the separator (21).

9. The device (10) of claim 6, further comprising a separator (21) fixed on fixed on a transformer ground (3) for separating oil from flammable gas in the oil and flammable gas mixture, wherein:
(a) the duct (13) comprises an horizontal first duct pipe (131), a duct elbow (132) and a second duct pipe (133) that extends vertically downward, the first duct pipe (131), the duct elbow (132) and the second duct pipe (133) are in fluid communication,
(b) the second duct pipe (133) is connected to and in fluid communication with the separator (21), and
(c) in use during a transformer short-circuit, the oil and flammable gas mixture ejected from the diffuser (16), is conveyed to the separator (21) by way of the duct (13), but then due to a slight slope of the first duct pipe (131), the oil is allowed to return to the diffuser (16) from the separator (21) after the flammable gases have been separated from the oil in the flammable gas mixture in the separator (21).

10. The device (10) of claim 6, wherein the diffuser (16) comprises:
   a diverging wall (161);
   a converging wall (163); and
   a cylindrical wall (162) between the diverging wall (161) and the converging wall (163).

11. The device (10) of claim 6, wherein at least one shock absorber (14) is located upstream of the diffuser (16).

12. The device (10) of claim 6, wherein at least one shock absorber (14) is located downstream of the diffuser (16).

13. The device (10) of claim 6, wherein:
   at least one shock absorber (14) is attached to the diffuser outlet flange (164); and
   the diffuser (16), and a first duct pipe (131) of the duct (13) are aligned along a third axis, the third axis being sightly inclined upward relative to horizontal to allow oil to return to the transformer tank (2) after explosion of the transformer (1) has been avoided.

14. The device (10) of claim 6, wherein the diffuser (12) comprises:
   a diverging wall (161) and a converging wall (163); and
   a cylindrical wall (162) between the diverging wall (161) and the converging wall (163), the cylindrical wall (162) having an internal diameter that is at least twice as large as each of those of the overly high transient oil pressure release member (15), the diffuser inlet flange (160) and the diffuser outlet flange (164).

15. A control arrangement (400) comprising:
   a control unit (23) capable of monitoring operation of the device (10) according to claim 6;
   the overly high transient oil pressure relief member (15);
   the static pressure relief valve (22);
   an automatic shutter valve (5); and
   circuit breakers (306),
   wherein,
      the control unit (23) is equipped with information processing means receiving signals from at least the overly high transient oil pressure relief member (15), the automatic shutter valve (5), and the static pressure relief valve (22) for transmitting a signal for tripping the transformer circuit breaker (306) or for triggering a preventive fire extinguishing process.

16. An installed electrical transformer (1) retrofitted with a device (10) according to claim 6, for preventing an explosion of an electrical transformer due to overly high transient oil pressure.

17. An uninstalled electrical transformer provided with a device (1) according to claim 6, for preventing an explosion of an electrical transformer due to overly high transient oil pressure.

18. A device (10) for preventing explosion of electrical transformers due to overly high transient oil pressure, comprising:
   an adaptor (11) as set forth in claim 1, the adaptor (11) coupled to a transformer tank outlet flange (2d) of a transformer tank outlet (2c) with the first drilled interface (111) in fluid communication with the transformer tank outlet (2c);
   a static spring pressure release valve (22) coupled to the adaptor outlet (113a) and the adaptor outlet flange (113);
   an overly high transient oil pressure release member (15) directly coupled to the adaptor (11) and in fluid communication up to its inlet face with the second drilled interface (112);
   a vertically oriented diffuser (16) with a diffuser inlet flange (160) attached to and in fluid communication with the outlet of the overly high transient oil pressure release member (15) only when the overly high transient oil pressure release member (15) opens due to an overly high transient oil pressure in the transformer tank (2) generated by an internal rupture of insulation in the transformer (1) causing a transformer short-circuit;
   an angle elbow (19) with an angle elbow inlet flange (190) bolted to a diffuser outlet flange 164);
   a duct (13) capable of conducting an oil and flammable gas mixture away from the angle elbow (19); and
   at least one shock absorber (14) located downstream of the diffuser (16) to eliminate very vigorous transformer shocks produced by immediate strong explosive gases generation provoked by internal rupture of insulation in the transformer (1), the shock absorber (14) being designed to avoid breaking of pipes, ducts, or gaskets because of the shocks which would render useless the device (10) for preventing explosion of electrical transformers,
   wherein,
      the diffuser (16), the overly high transient oil pressure release member (15) are aligned along the first axis,
   during normal transformer operation, an insulating oil fills the adaptor (11) up to an inlet face of the overly high transient oil pressure release member (15),
   during a transformer short-circuit, the overly high transient oil pressure release member (15) is configured to open in response to an explosive overly high transient surge in oil pressure and allow the oil and flammable gas mixture to flow into the diffuser (16),
      the overly high transient oil pressure release member (15) is set to open at an oil pressure that is higher than that at which the transformer static spring pressure relief valve (22) opens because the static spring pressure relief valve (22) is not designed to react to an overly high transient oil pressure, and
      the diffuser (16) receives the oil released upon opening of the overly high transient oil pressure member (15) and quickly facilitates depressurization of the oil inside the transformer tank (2) to avoid its explosion.

19. An arrangement for preventing explosion of electrical transformer occurring from the bushings (6) connection at their base to the transformer windings with three respective bushing turrets (BT) (6a) or three bushing oil cable boxes (BOCB) (6a) equipped with flanges (6d), comprising a device (10) according to claim 6, with three adaptors (11) respectively attached to the three flanges (6d) of the BTs or the BOCBs.

* * * * *